United States Patent [19]

Gelnett

[11] 4,111,223
[45] Sep. 5, 1978

[54] CONTROL LINE RELIEF VALVE

[75] Inventor: Leland E. Gelnett, Du Bois, Pa.

[73] Assignee: Rockwell International Corporation, Pittsburgh, Pa.

[21] Appl. No.: 726,904

[22] Filed: Sep. 27, 1976

[51] Int. Cl.² ............................................. F16K 31/12
[52] U.S. Cl. ................................. 137/115; 137/116.3; 137/505.11
[58] Field of Search ............. 137/116.3, 116.5, 505.11, 137/505.13, 505.22, 505.23, 102, 115, 118

[56] References Cited

U.S. PATENT DOCUMENTS

| 1,769,612 | 7/1930 | Wettstein | 137/505.22 X |
| 2,496,577 | 2/1950 | Cahill | 137/115 |
| 2,599,534 | 6/1952 | Annin | 137/505.22 X |
| 3,460,559 | 8/1969 | Pullen et al. | 137/116.5 |
| 3,565,095 | 2/1971 | Zeiglel | 137/116.3 X |

Primary Examiner—William R. Cline

[57] ABSTRACT

The invention covers a control line relief valve which restricts control line flow in the event of overpressurization, and vents one portion of the line.

9 Claims, 5 Drawing Figures

CONTROL LINE RELIEF VALVE

BACKGROUND OF THE INVENTION

The present invention relates to pressure-responsive relief valves for limiting fluid pressure. In fluid lines, diaphragm-type regulators are commonly used to reduce and/or control the line fluid pressure. Many of these have a pilot line from a distance downstream for applying fluid pressure to the diaphragm. To protect the diaphragm from excessive pressure, a relief valve or other protective device is sometimes placed in the pilot line.

Also, in the case of valuable instruments and other controls, a protective device is sometimes placed in the fluid line to the instrument or control.

The practice in the past has been to place a pressure-responsive "pop-off" valve which merely vents the control line, without regard to maintaining sufficient pressure on the regulator to keep it closed.

SUMMARY OF THE INVENTION

The present invention is a pressure-responsive relief valve which limits the venting by restriction of the port openings, and more specifically, restricting one port opening much more than the other. This allows for restriction of the pressure build-up while also venting the line. In normal operation, full flow between ports occurs and the vent is closed. In the event of malfunction or failure, the relief valve of this invention operates to limit the pressure build-up while venting the excess from the line. Upon return to normal line conditions, the valve reverts to the normal setting where full communication between ports is re-established and the vent passage is closed off.

Accordingly, it is a primary object of the present invention to provide a pressure-responsive valve that protects instruments or the like against overpressurization.

It is another object of the present invention to provide a pressure-sensitive valve that restricts flow while at the same time reducing line pressure.

It is yet a further object of this invention to provide a valve that resets itself upon restoration of normal conditions.

Another object of the present invention is to minimize the relief flow to atmosphere by restricting the port openings.

These and other objects and advantages of the present invention will become apparent from the following specification disclosing a preferred embodiment as shown in the accompanying drawings.

DESCRIPTION OF A PREFERRED EMBODIMENT

Figure 1:
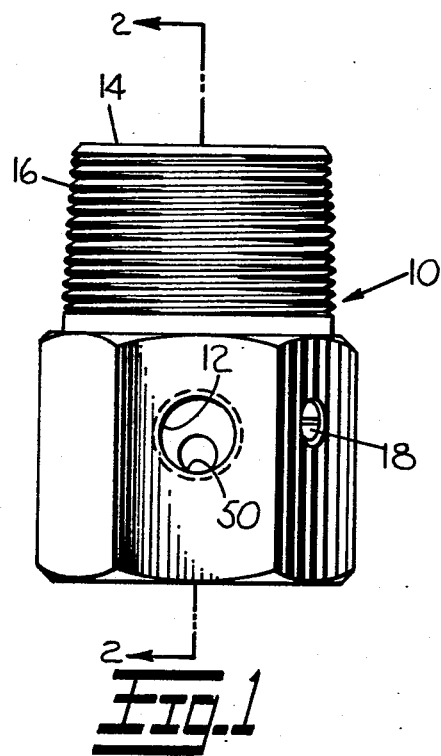
FIG. 1 is a side elevation of the valve of the present invention.

FIG. 1 shows the body of valve 10 with one passage 12. The body can be any desired configuration — in FIG. 1, it was made from hexagonal bar stock, with the open (vent) end 14 being turned and threaded as at 16 for use with a vent pipe if desired. The head of stop 18 also can be seen in this view.

Figure 2:
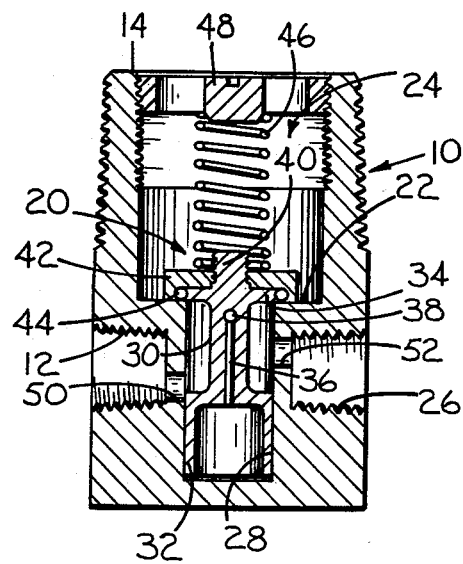
FIG. 2 is a section along line 2—2 of FIG. 1.
Figure 3:
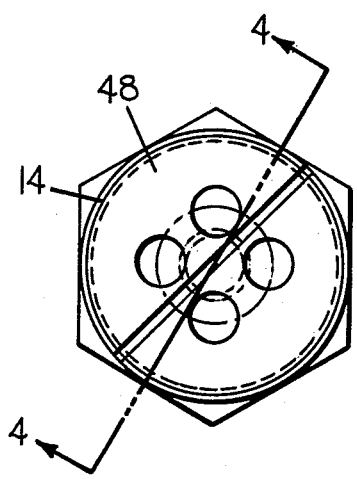
FIG. 3 is a top view of the valve.

FIG. 2 shows the valve 10 in the normal operating position with valving member 20 seated on the shoulder 22 of stepped bore 24. In this position there is free and full communication between passages 12 and 26 via the smaller bore 28 of stepped bore 24. Valving member 20 has a stem portion 30 integral with a cylindrical bottom portion 32, and a flange 34 fixed adjacent the other end of stem 30. The cylindrical bottom portion 32 is open on its bottom end, and a passageway 36 extends from this cylinder upwardly through the stem 30, intersecting a cross bore 38 near the flange 34. This places the space enclosed by cylinder 32 in fluid communication with the space above cylinder 32 delineated by small bore 28 and flange 34.

The other end of valving member 20 has a short threaded stem portion 40 extending beyond flange 34. A cover 42 screws down over flange 34 retaining a suitable resilient seal member 44 for sealing small bore 28 from the vent opening. Coil spring 46 is mounted between cover 42 and perforated vent cap 48, providing spring bias to close valving member 20. Vent cap 48 is threaded into the end of valve 10, and provides a means of adjusting the spring bias on valving member 20.

Figure 5:
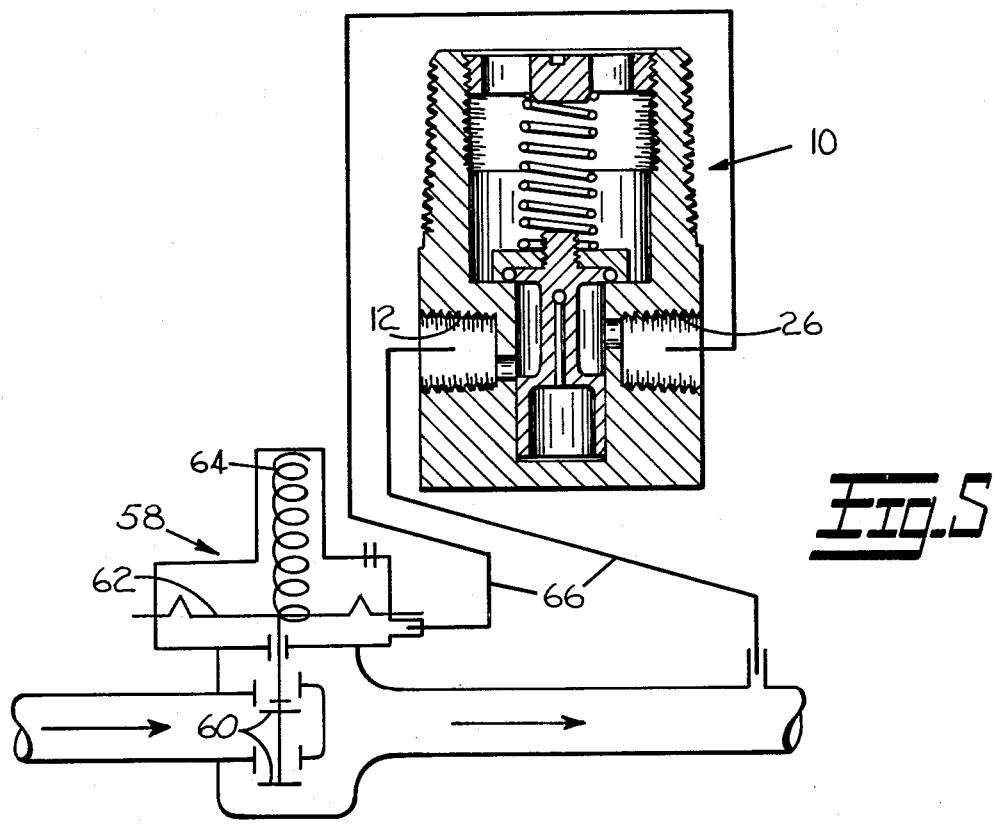
FIG. 5 is a diagrammatic view of the valve in combination with a fluid pressure regulator for control of the fluid pressure in a pipe line.

Line passages 12 and 26 are drilled and tapped on opposite sides of valve 10 for insertion in a fluid pressure line, as seen in FIG. 5. On the inner portion of these passages, smaller holes are completed into bore 28. As can be seen from FIG. 2, hole 50 is drilled with its axis offset downwardly from the axis of passage 12, while hole 52 has its axis offset upwardly from the axis of passage 26, for a reason to be explained later.

Figure 4:
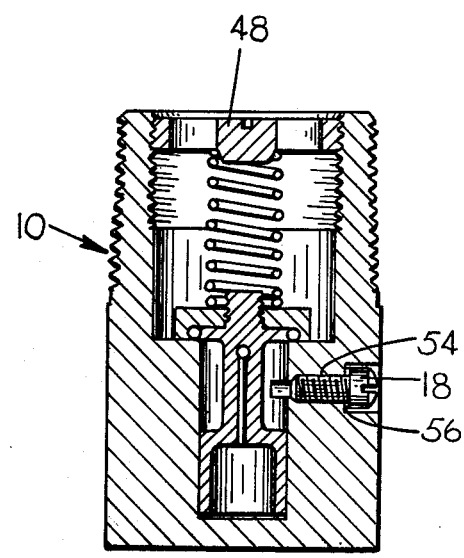
FIG. 4 is a section along line 4—4 of FIG. 3.

At a point on the body 10 where it does not interfere with line passages 12 and 26, a hole 54 is drilled and tapped to receive a stop member 18, best seen in FIG. 4. This stop member has a reduced diameter end portion which projects into the chamber of small bore 28, at a place to limit the upward travel of valving member 20. This stop member accommodates a seal member 56 on it to prevent leakage, and the stop 18 and seal 56 are screwed into position after valving member 20 is placed in bore 24.

As can be seen from the above description and the accompanying drawings, the valve 10 is intended to be placed in a pressurized fluid line to prevent overpressurization. Under normal operation, the valve is as shown in FIGS. 2 and 4. Whenever excessive pressure (determined by the strength of spring 46 and the adjusted position of cap 48) is encountered, this pressure is applied in chamber 28 to the underside of flange 34. The pressure is also applied to the outside of cylinder 32, but due to passageway 36 and cross bore 38, the pressure is also applied to the inside of cylinder 32. The sum of the surfaces against which pressure is applied gives an unbalanced force applied to urge the valve open, or upwardly, as seen in FIG. 2, against the bias of spring 46. When a sufficiently high pressure is sensed, valving member 20 will move upwardly against spring 46. This movement chokes off communication between hole 50 on the inner end of passage 12 and chamber 28, while still allowing communication between hole 52 on the inner end of passage 26 and chamber 28. At the same time, chamber 28 is opened longitudinally to atmosphere via the large portion of bore 24 and perforations in cap 48. This position effectively maintains whatever pressure exists in passage 12 and its connecting piping while venting passage 26 and its piping.

An example of a system utilizing the instant invention can be seen in FIG. 5. This is a diagrammatic representation of a diaphragm type fluid regulator 58 with valves 60 in the fluid flow line. The diaphragm 62 is spring loaded with a spring 64, and a pilot line 66 conveys the downstream fluid pressure to the other side of the diaphragm. In the event that foreign matter jams the regulator valves 60 open or some similar occurrence takes place, the pressure may build up to a level to damage the diaphragm 62, sometimes even to the point of rupture. To avoid this, relief valve 10 is inserted in the line 66. As shown in FIG. 5, when overpressure occurs downstream, it is communicated to relief valve 10 which then opens, and the downstream line is restricted while the portion of line 66 between the relief valve and the regulator diaphragm is vented to atmosphere through bore 24 and vent cap 48. If it is desired to channel the vented fluid somewhere, piping (not shown) may be threaded on the threads 16 on the exterior of relief valve 10.

It is the pressure in line 66 between the relief valve 10 and the regulator 58 which determines the amount of venting to atmosphere and the amount of restriction of port 50. In this connection, it is recognized that it is desirable to maintain a slightly elevated level of pressure in the regulator to assure that the regulator does not open. This avoids adding to the downstream overpressure condition. Existing pop-off valves will either not vent enough fluid to maintain a safe level of pressure, or will vent too much fluid to atmosphere allowing the regulator to open, compounding the problem.

This relief valve will also act bi-directionally to alleviate any pressure increase generated at the regulator end of the control line, such as might be caused by a failed pilot regulator, or bad seals. By venting through the relief valve, this prevents excess pressure from damaging the regulator and/or prevents the excess pressure from going into the line downstream of the regulator.

It can be seen that the relief valve of this invention can also be used to protect pilot regulators, measuring instruments, control devices and other mechanisms. For example, if it is installed in the inlet line to a pilot regulator, it can prevent damage to the pilot from excess inlet pressure. In the case of measuring instruments, these can be installed in a suitable branch line for measuring pressure or temperature or the like. One of these relief valves installed between the instrument and the main line would maintain a desired pressure level while venting any excess, in the event of a pressure surge or other overpressurization. In that event, the relief valve is used to restrict the connection to the fluid line while venting the line connected to the measuring instrument, keeping the instrument pressure at a safe level. Similar uses will occur to those skilled in the art.

I claim:

1. A relief valve comprising a body having a stepped blind bore longitudinally therein and inlet and outlet transverse passages intersecting the smaller diameter bore of said stepped bore, a valve member movable in said bore having a cylinder open on the bottom, a stem portion projecting coaxially from the closed end of said cylinder toward the open end of said stepped bore and carrying a flange engageable with the shoulder of said stepped bore when said valve member is in a first position, a cap closing said bore open end, a spring between said cap and said valve member biasing said valve member towards said first position, said valve member movable to a second position against said spring bias in which said flange is unseated from said shoulder, allowing communication between said smaller diameter and the larger diameter of said stepped bore, said inlet passage opening into said smaller diameter bore adjacent said closed end of said cylinder when said valve member is in said first position, said outlet passage opening into said smaller diameter bore intermediate said inlet passage opening and said shoulder of said stepped bore, bore means communicating the interior of said cylinder with the portion of said stepped bore between said cylinder and said flange, and vent means connecting said larger diameter bore with the atmosphere.

2. The relief valve of claim 1, wherein stop means limits the amount of movement of said valve member in said body.

3. The relief valve of claim 1, wherein said cap closing said bore is adjustable for adjustably loading said spring.

4. The relief valve of claim 3, wherein said cap is perforated, thereby providing said vent means.

5. The relief valve of claim 4, wherein said body is externally threaded about said cap.

6. In a fluid flow line a combination comprising, a pressure regulator with a pressure control valve in said line, a diaphragm connected to said control valve in a diaphragm chamber, one side of said diaphragm being exposed to the fluid pressure downstream of said control valve, whereby increased downstream pressure operates on said diaphragm to move said control valve towards the closed position, a relief valve in a line connected between said diaphragm chamber and said fluid flow line downstream of said control valve, said relief valve having a body with a stepped blind bore longitudinally therein and inlet and outlet transverse passages intersecting the smaller diameter bore of said stepped bore, a valve member movable in said bore having a cylinder open on the bottom, a stem portion projecting coaxially from the closed end of said cylinder toward the open end of said stepped bore and carrying a flange engageable with the shoulder of said stepped bore when said valve member is in a first position, a cap closing said bore open end, a spring between said cap and said valve member biasing said valve member towards said first position, said valve member movable to a second position against said spring bias in which said flange is unseated from said shoulder, allowing communication between said smaller diameter and the larger diameter of said stepped bore, said inlet passage opening into said smaller diameter bore adjacent said closed end of said cylinder when said valve member is in said first position, said outlet passage opening into said smaller diameter bore intermediate said inlet passage opening and said shoulder of said stepped bore, bore means communicating the interior of said cylinder with the portion of said stepped bore between said cylinder and said flange, and vent means connecting said larger diameter bore with the atmosphere.

7. The combination defined in claim 6 in which said inlet passage is closed and said outlet passage is connected to said vent passage in said second position.

8. In a fluid control system, the combination of a diaphragm operated pressure regulator with a pressure control valve in a fluid flow line, one side of said diaphragm being exposed to fluid pressure downstream of said control valve, whereby increased downstream pressure operates on said diaphragm to move said control valve towards the closed position, a relief valve in a line connected between said diaphragm chamber and said fluid flow line downstream of said control valve, said relief valve having a body with a stepped blind bore longitudinally therein and inlet and outlet transverse passages intersecting the smaller diameter bore of said stepped bore, a valve member movable in said bore having a cylinder open on the bottom, a stem portion projecting coaxially from the closed end of said cylinder toward the open end of said stepped bore and carrying a flange engageable with the shoulder of said stepped bore when said valve member is in a first position, a cap closing said bore open end, a spring between said cap and said valve member biasing said valve member towards said first position, said valve member movable to a second position against said spring bias in which said flange is unseated from said shoulder, allowing communication between said smaller diameter and the larger diameter of said stepped bore, said inlet passage opening into said smaller diameter bore adjacent said closed end of said cylinder when said valve member is in the first position, said outlet passage opening into said smaller diameter bore intermediate said inlet passage opening and said shoulder of said stepped bore, bore means communicating the interior of said cylinder with the portion of said stepped bore between said cylinder and said flange, and vent means connecting said larger diameter bore with the atmosphere.

9. The combination of claim 8 wherein said outlet passage is connected to said vent passage in said second position of said valve member.

* * * * *

UNITED STATES PATENT AND TRADEMARK OFFICE
CERTIFICATE OF CORRECTION

PATENT NO. : 4,111,223
DATED : September 5, 1978
INVENTOR(S) : Leland E. Gelnett It is certified that error appears in the above-identified patent and that said Letters Patent are hereby corrected as shown below:

In the abstract, after the word "line", last occurence, insert --and the combination wherein this relief valve is used to protect the diaphragm of a pressure regulator--.

Signed and Sealed this

Third Day of April 1979

[SEAL]

Attest:

RUTH C. MASON
Attesting Officer

DONALD W. BANNER
Commissioner of Patents and Trademarks